INVENTORS
George A. Reed
James A Mott
BY Popp and Sommer
ATTORNEYS

Aug. 22, 1961 G. A. REED ET AL 2,996,947
AIRCRAFT LANDING SYSTEM
Filed Aug. 25, 1959 5 Sheets-Sheet 2

INVENTORS
George A. Reed
James A. Mott
BY Popp and Sommer
ATTORNEYS

INVENTORS
George A. Reed
James A. Mott
BY Popp and Sommer
ATTORNEYS.

Aug. 22, 1961   G. A. REED ET AL   2,996,947
AIRCRAFT LANDING SYSTEM
Filed Aug. 25, 1959   5 Sheets-Sheet 4

INVENTOR
George A. Reed
James A. Mott
BY Popp and Sommer
ATTORNEYS

INVENTOR
George A. Reed
James A. Mott
BY Popp and Sommer
ATTORNEYS

United States Patent Office 2,996,947
Patented Aug. 22, 1961

2,996,947
AIRCRAFT LANDING SYSTEM
George A. Reed, Williamsville, and James A. Mott, Buffalo, N.Y., assignors to The Oxford Corporation, Williamsville, N.Y., a corporation of New York
Filed Aug. 25, 1959, Ser. No. 836,012
8 Claims. (Cl. 88—1)

This invention relates to an aircraft landing system and more particularly to improved method and means for landing aircraft, which method and means are based upon a geometrical principle and thereby provide positive terrain clearance, a controlled, preestablished sink speed at touchdown, and touchdown at a predetermined point.

While the invention is adapted for use in connection with civilian or military aircraft, including both fixed and rotary wing types, and for use in connection with landing surfaces located on land or water or on the deck of an aircraft carrier, it is particularly adapted for use in connection with Army aircraft. Tactical employment of Army aircraft presents operational problems which are unique and which are especially difficult in connection with the landing of the aircraft. The outstanding characteristics of the situation which contribute to the landing problem are as follows.

Operation is expected from relatively unprepared landing sites. None of the normal runway lighting is expected to be available. The fields are expected to be of minimum length in many cases, hence precision of the touchdown point is important. The fields may be expected to have severe terrain obstacles in many cases, which are unfamiliar to the personnel operating from the field. Security of the field will depend heavily upon concealment and use of minimal illumination. Night operation is a requirement. Operations in snow with attendant problems concerned with "white out" are expected. All-weather operation is desired with zero visibility extending to the ground. All equipment associated with the operation must be extremely durable, simple, light in weight, and readily maintainable under field conditions. Finally, operation is expected to include both fixed wing and rotary wing aircraft.

Accordingly, it is the primary object of this invention to provide an improved method and means for landing aircraft which will meet all of the aforesaid requirements.

Another object of the invention is to provide an improved method and means for landing aircraft which provides positive terrain clearance, and insures touchdown at a precise point, with an acceptable sink speed.

Another object of the invention is to provide an improved method and means for landing aircraft which are based upon a geometrical principle providing complete vertical control through the direct measurement of a single quantity in the aircraft.

Another object of the invention is to provide an improved method and means for landing aircraft which provide lateral alinement information.

Another object of the invention is to provide an improved method and means for landing aircraft which are particularly well adapted to hasty installation in unprepared sites and which are capable of accommodating both rotary and fixed wing aircraft.

Another object of the invention is to provide an improved method and means for landing aircraft which permit great flexibility in possible flight descent paths which will satisfy all operational requirements, including the type of aircraft, a short field and approach obstacles.

Another object of the invention is to provide an improved method and means for landing aircraft which can readily be adapted for operation at night, in snow, and as a matter of fact, under all weather conditions including zero visibility.

Another object of the invention is to provide an improved method and means for landing aircraft utilizing equipment which is of rugged and durable construction, yet simple and light in weight, as well as being well suited to field use and readily maintainable under field conditions.

Another object of the invention is to provide an improved method and means for landing aircraft which are based upon a geometrical principle and which derive the benefits of the simplicity of the geometry, inasmuch as only one measurement need be made, and that is the angle between the lines of sight from the aircraft to signal and target means spaced a predetermined distance apart longitudinally on the landing surface.

Another object of the invention is to provide an improved method and means for landing aircraft based upon a geometrical principle in which the error signal is derived in the aircraft, as a result of which no data link is required from the ground to the plane.

Another object of the invention is to provide an improved method and means for landing aircraft wherein the ground installation does not require any personnel, since no tracking of the aircraft is involved.

Another object of the invention is to provide an improved method and means for landing aircraft which are based upon a geometric principle providing a curved descent flight path, the curvature of which is readily variable merely by adjusting the spacing between the signal and target means on the landing surface.

Another object of the invention is to provide an improved method and means for landing aircraft which permits a simple procedure that ground personnel may use to check that adequate terrain clearance will be provided by the signal and target means spacing which is used.

Other objects and advantages of the invention will become apparent upon consideration of the following detailed description and drawings wherein.

System geometry

Figure 1:
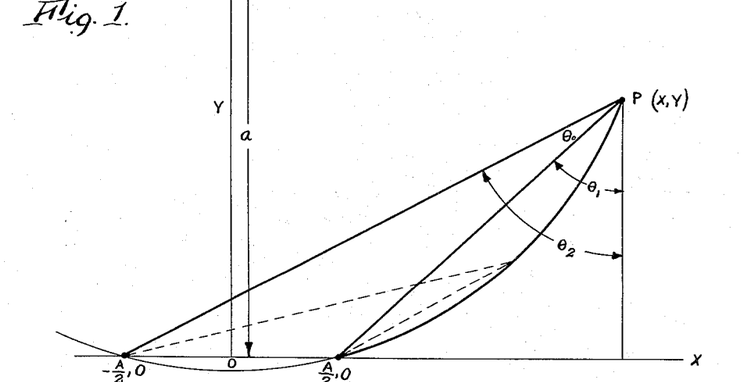
FIG. 1 is an elevational schematic view illustrating the geometry of the invention.

Referring to the drawings, and particularly FIG. 1, the essential characteristics of the invention lie in the geometry illustrated. While this figure is only schematic, it might well be considered as a vertical section along the landing surface or runway, with an aircraft at point $P(x,y)$ making its approach. The geometric concept involves the location of two reference points on the runway at $-A/2$ and $A/2$. The aircraft is then flown or maneuvered in such a manner that the angle $\theta_0$ between the lines of sight from P to $A/2$ and $-A/2$ is achieved and maintained constantly. Under this condition of a constant angle $\theta_0$, the locus of P can be determined as follows:

$$\tan \theta_1 = \frac{X-A/2}{Y} = \tan(\theta_2 - \theta_0)$$

$$\frac{X-A/2}{Y} = \frac{\tan \theta_2 - \tan \theta_0}{1 + \tan \theta_2 \tan \theta_0} \quad \text{(basic formula)}$$

However;

$$\tan \theta_2 = \frac{X+A/2}{Y}$$

and if $\theta_0$ is assumed small so that $\tan \theta_0 = \theta_0$, where $\theta_0$ is substantially less than one radian, then $$\frac{X-A/2}{Y} = \frac{\frac{X+A/2}{Y} - \theta_0}{1 + \left(\frac{X+A/2}{Y}\right)\theta_0}$$

This may be rewritten as:

$$Y^2 - \frac{A}{\theta_0}Y + X^2 - \frac{A^2}{4} = 0 \quad (1)$$

Figure 2:
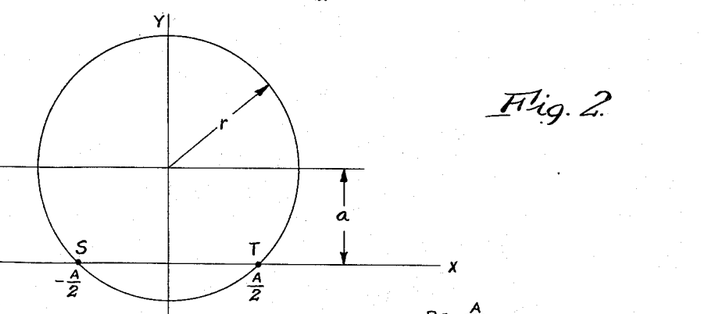
FIG. 2 is a similar schematic view, on a smaller scale, illustrating a complete circle which includes a desired descent flight path.

Equation 1 is the locus of the point P under the condition that $\theta_0$ is a constant and assuming that $\tan \theta_0 = \theta_0$. Examination of this equation shows that the locus is a circle with its center displaced along its Y axis. This can be more readily seen with the aid of FIG. 2, where the equation of the circle is:

$$(y-a)^2 + x^2 = r^2$$

This may be rewritten as:

$$y^2 - 2ay + x^2 + (a^2 - r^2) = 0$$

which has the same form as Equation 1. By equating like coefficients it can be seen that:

$$2a = \frac{A}{\theta_0} \quad \text{or} \quad a = \frac{A}{2\theta_0}$$

and $$a^2 - r^2 = -\frac{A^2}{4} \quad \text{or} \quad r^2 = \frac{A^2}{4\theta_0^2} + \frac{A^2}{4}$$

so $$r = A/2\left(\frac{1}{\theta_0^2} + 1\right)^{1/2}$$

Equation 1 therefore is a circle with its center located a distance $A/2\theta_0$ above the ground, and having a radius of $A/2(1+1/\theta_0^2)^{1/2}$.

If $\theta_0$ is substantially less than one radian, the radius is approximately equal to $A/2\theta_0$. The circle, of course, intersects the runway at $A/2$ and $-A/2$.

By differentiating Equation 1 the slope of the flight path at any point can be established as:

$$\frac{dy}{dx} = x\left(\frac{A^2}{4\theta_0^2} + \frac{A^2}{4} - x^2\right)^{-1/2} \quad (2)$$

and at touchdown, where $x = A/2$ $$\frac{dy}{dx} = \frac{A}{2}\left(\frac{2\theta_0}{A}\right) = \theta_0 \quad (3)$$

As a result, Equation 3 indicates that the slope of the circle at its intersection with the landing surface is solely dependent upon the angle $\theta_0$.

Figure 3:
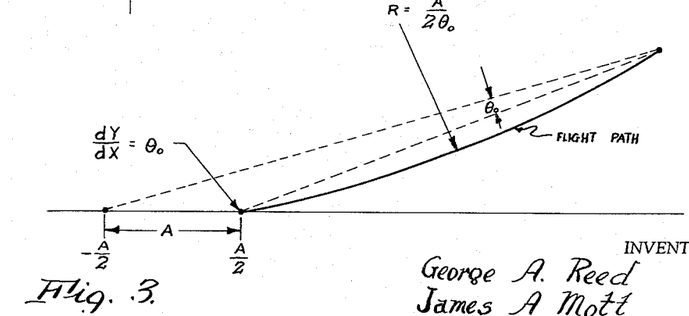
FIG. 3 is a schematic view similar to FIG. 1 and illustrating in detail the descent flight path, the spacing between the signal and target means on the landing surface, and the desired constant angular relationship between the lines of sight from the aircraft to the aforesaid signal and target means.

The proposed geometry of the inventive system as illustrated in FIG. 3, is composed of two points established along the runway, separated by a predetermined distance A and an instrument in the aircraft to measure the angle $\theta_0$ between the lines of sight to these two points. The flight descent path of the aircraft being controlled by the system would be a circle:

(1) having a radius of $A/2\theta_0$
(2) intersecting the runway at $A/2$ and $-A/2$, and
(3) having a glide slope at $A/2$ (which, as will be seen later, will be coincident with the target means and closely adjacent actual touchdown of the airplane) of $\theta_0$.

System gain

The error signal measured in the aircraft is the position of the target and signal means at $A/2$ and $-A/2$ respectively, with respect to each other. As such, it may rewritten as:

$$E = (\theta - \theta_0)\left(X - \frac{A}{2}\right)$$

where $\theta_0$ is the actual angle between the two lines of sight and $(x-A/2)$ is the range to the target means at $A/2$ therefore $$\frac{dE}{d\theta} = \left(X - \frac{A}{2}\right)$$

From Equation 1

$$\theta = \frac{AY}{Y^2 + X^2 - \frac{A^2}{4}}$$

and $$\frac{\partial \theta}{\partial Y} = -\frac{A(Y^2 - X^2 + A^2/4)}{(Y^2 + X^2 - A^2/4)^2}$$

From this the system gain may be determined as:

$$\frac{dE}{dY} = \left(\frac{dE}{d\theta}\right)\left(\frac{d\theta}{dY}\right) = -\frac{A(Y^2 - X^2 + A^2/4)}{(Y^2 + X^2 - A^2/4)^2}(X - A/2)$$

Since Y is substantially less than X, this equation may be simplified to $\frac{dE}{dY}$ is substantially equal to $\frac{A(X-A/2)}{X^2-A^2/4} = \frac{A}{X+A/2}$ (4)

Equation 4 shows that the system gain is unity at touchdown, and decreases inversely with range. Such a variation is desirable and does result in satisfactory dynamic characteristics.

Wheel to eye distance

Figure 4:
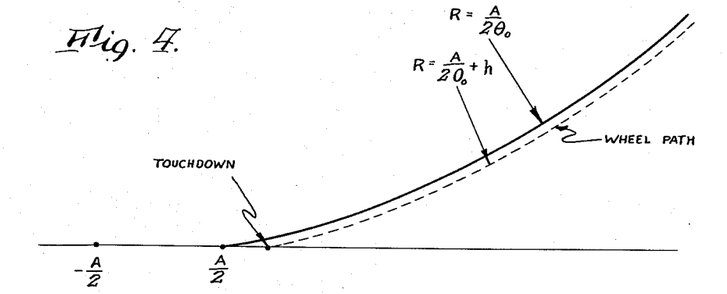
FIG. 4 is a similar schematic view illustrating the difference in the theoretical, or high level descent flight path and the actual descent path of the wheels of the airplane, together with the difference between the theoretical and actual touchdown points caused by the "wheel to eye" distance.

The inventive system requires the measurement of the angle from some point in the aircraft and causes that point to be flown along the path described. No consideration has as yet been given herein to the aircraft's wheels which may be some five to ten feet below this point of measurement. The effect of this "wheel to eye" distance is illustrated in FIG. 4, wherein the actual wheel path is along a circle having a radius equal to $$\frac{A}{2\theta_0} + h$$

where $h$ equals the wheel to eye distance.

The result of course, is that touchdown actually occurs at some small distance short of the $A/2$ point and the descent rate at touchdown is slightly higher. The back-setting of the touchdown point is desirable, particularly if the system is used in a visual form to be later described, since it guarantees touchdown before passing the references on the runway, such as the target and signal means to be later described, and losing sight of them. Thus, for practical purposes, this "wheel to eye" factor can be ignored.

Operational characteristics

The basic geometrical characteristics of the inventive system as illustrated in FIG. 3 for example, imply a number of operational concepts, as follows:

The measurement of only a single quantity, $\theta_0$, is necessary, and this measurement is made in the aircraft where it is needed. The sink speed (the vertical component of the velocity of the descending aircraft) at touchdown, which is significant to the particular aircraft involved, is established in the aircraft by selecting $\theta_0$, and it is worthy of note at this point that a $\theta_0$ in the range of .01 to .015 radian is acceptable for all aircraft of known design to date. The radius of the descent flight path, and therefore the terrain clearance, a factor characteristic to each particular landing area, is controlled on the landing surface by selecting the A distance between the target and signal means. In addition, the extreme simplicity of the adjustment makes the system very adaptable to hasty installations under varying terrain conditions. Moreover, the exact theoretical touchdown point $A/2$ is established on the landing surface, and accurate vertical and horizontal position information is available to the pilot all the way to touchdown. The system also allows approaches over a wide variety of descent angles and guarantees a safe descent speed at touchdown, and the great flexibility of this system makes it equally adaptable to helicopter and fixed wing applications.

Physical equipment for visual day or night landing aid

Figures 5, 6:
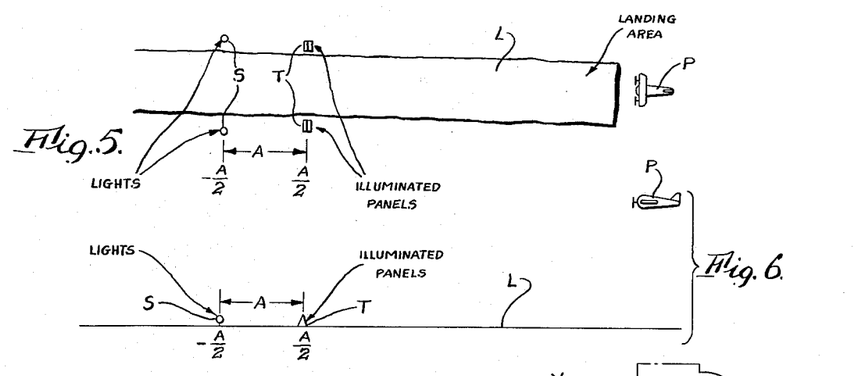
FIG. 5 is a schematic top plan view illustrating the landing surface and the actual location of the spaced signal and target means thereon.
FIG. 6 is a side elevational view illustrating the components shown in FIG. 5.

In order to instrumentate or embody the geometry presented above, it is only necessary to provide luminous target and signal means which are located on the landing surface, and a means located in the aircraft for measuring the desired constant angle $\theta_0$ between the two lines of sight diverging from the aircraft to the signal and target means respectively. The landing surface equipment is schematically shown in FIGS. 5 and 6, and includes a typical landing surface or runway L, a pair of signals S, each signal being located adjacent the corresponding side of the runway L, and a pair of targets T similarly located along the sides of the runway, but spaced from the signals S a predetermined distance A longitudinally along the runway. The locations of the signals and targets correspond to points $-A/2$ and $A/2$ respectively, as illustrated in FIGS. 1-4.

In the preferred embodiment, the signals S are actually illuminated lamps or lights of the desired intensity and the targets are illuminated panels, the signals preferably being of a spherical shape and the targets of a rectangular shape in order to clearly distinguish between the two. Furthermore, in the preferred embodiment, it will be noted that the target means are located nearer to the landing or right end of the runway, as shown in FIGS. 5 and 6, so that they will be closest to an airborne aircraft P approaching from a position to the right of the landing end of the runway, and thus to one side of both the signals S and targets T, as schematically illustrated in FIGS. 1-4.

However, this arrangement is not absolutely necessary, because under proper conditions as will be more clearly understood hereinafter, the position of the signals S and targets T could be reversed while maintaining the aforesaid approach position of the aircraft. In addition, depending upon the capability of the aircraft, it could be located at any desired point on the circular path such as illustrated in FIG. 2, including a position above and between the targets and signals. For all practical purposes, however, both fixed and rotary wing type aircraft presently constructed would ordinarily approach from a position such as shown in FIGS. 1-4 to the set-up illustrated in FIGS. 1-5.

Figure 7:
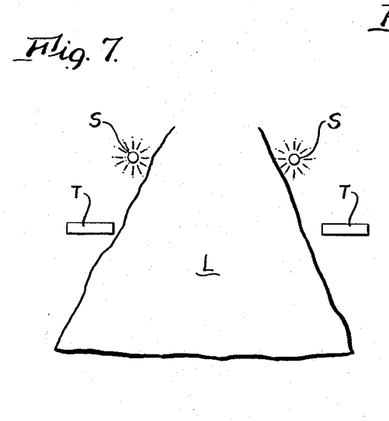
FIG. 7 is a schematic view of the landing surface, target and signal means of FIGS. 5 and 6 when viewed from the approaching aircraft.

Referring momentarily to the pilot's position within the aircraft, what he sees, without the aid of any angle measuring instrument, is illustrated in FIG. 7, the signals S and the targets T both appearing on each side of the runway L, with the signals S being positioned "above" the targets T.

Figure 8:
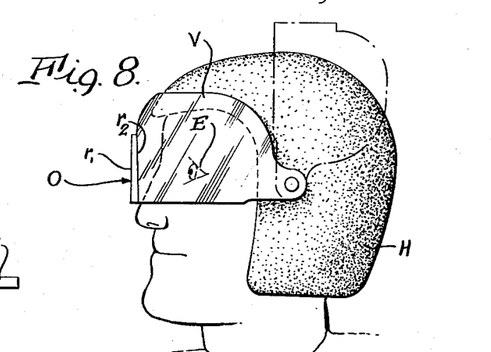
FIG. 8 is a partial side elevational view illustrating a preferred embodiment of an optical viewing device worn by the pilot and used in conjunction with the target and signal means of FIGS. 5 and 6.
Figures 9, 10, 11, 12:
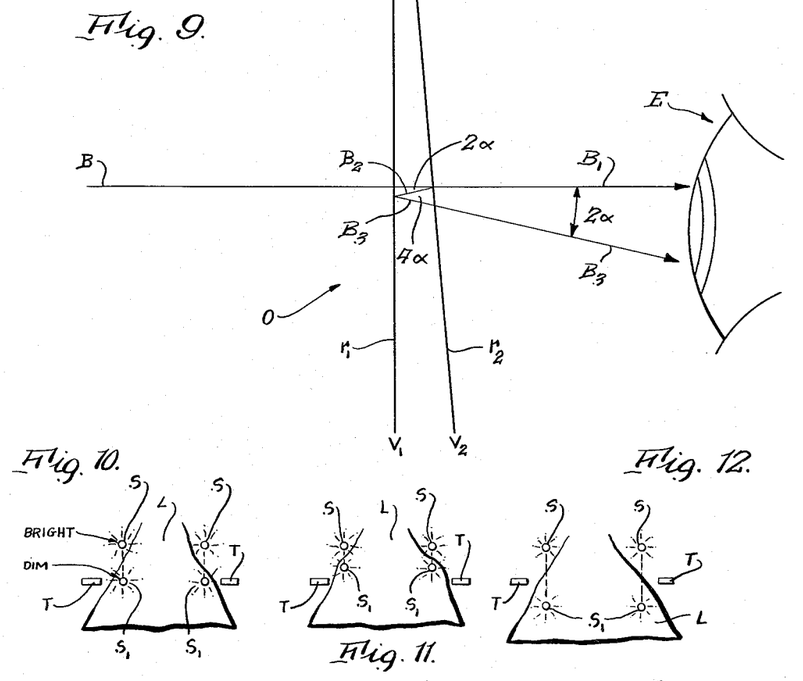
FIG. 9 is a partial schematic view illustrating certain details of the optical viewing device shown in FIG. 8.
FIG. 10 is a schematic view similar to FIG. 7, but also illustrating a reflected image of the signal means produced by the optical viewing device of FIGS. 8 and 9 when the reflected image is alined properly with the target means and thereby indicating the aircraft as being on the proper flight path.
FIG. 11 is a view similar to FIG. 10, but illustrating the reflected image of the signal means as being located out of alinement with and above the target means, and thereby indicating an aircraft position above the proper flight path.
FIG. 12 is a view similar to FIGS. 10 and 11 but illustrating the reflected image of the signal means out of alinement with and below the target means, and thereby indicating an aircraft position below the proper flight path.

A preferred embodiment of the means for measuring the angle $\theta_0$ between the lines of sight from the aircraft to the signals S and the targets T respectively, is illustrated in FIGS. 8 and 9 of the drawings. This means is an optical device comprising a visor V which is pivotally connected to the pilot's helmet H and which is movable from the dotted line or inoperative position to the solid line or operative position in front of the pilot's eyes E. The visor V in essence is equivalent to a pair of goggles and at its forward end located in front of the pilot's eyes it carries an optical lens O.

As also seen in FIG. 9, the optical device includes a lens O made of glass or any other suitable optical material and this lens is provided with two opposed planar surfaces $r_1$, $r_2$ which preferably diverge downwardly or groundwardly at a constant included angle $\alpha$, which angle is actually equal to $\theta_0/2$. These surfaces $r_1$, $r_2$ are actually combined light transmitting and reflecting surfaces and for this purpose are preferably coated with a suitable reflecting material such as titanium dioxide, the amount of reflectivity and transmissivity of the surfaces being determined by the thickness of the coating, which can be adjusted to that amount desired. In the preferred embodiment, the coating is thin enough to permit direct transmission of the images of the signals S and targets T, but thick enough to produce only a good image of the signals S, of the first reflective order.

Referring specifically to FIG. 9, it illustrates schematically the path of a light beam B approaching perpendicular to the surface $r_1$ (which is outermost from the pilot's eye, or nearest the objects to be viewed). As the light beam B passes through surface $r_1$ and reaches the inside of surface $r_2$, it is "split" into two parts, part $B_1$ and part $B_2$. The part $B_1$ is directly transmitted through surface $r_2$ to the pilot's eye E. However, the part $B_2$ is reflected downwardly and backwardly at an angle $2\alpha$ to the beam B, whereupon as the part $B_2$ reaches the inner side of surface $r_1$, it is split to form part $B_3$, which is reflected downwardly and forwardly toward surface $r_2$ at an angle $4\alpha$, whereupon part $B_3$ is transmitted indirectly to the pilot's eye E. Actually, the overall angle of indirect transmission of part $B_3$ is $2\alpha$, measured between parts $B_1$ and $B_3$.

Thus, if the beam B and coincident part $B_1$ were to be considered as the line of sight from the signals S to the pilot's eye E, the directly transmitted, brighter image would appear along this line of sight, while the indirectly transmitted, dimmer image would appear "below" this line of sight along beam part $B_3$ at the angle $2\alpha$, which would equal $\theta_0$, the constant angle desired for the particular aircraft being flown.

In the analysis so far, all refraction effects have been ignored, as they would have no effect upon the angular relationship between beam parts $B_1$ and $B_3$. The only effect would be to shift both beams $B_1$ and $B_3$ upwardly by the angle of refraction involved.

The above statements as to the action of the optical lens O on the images travelling along the lines of sight between the aircraft and the target T and the signals S is substantiated by the following mathematical analysis. Assuming:

$F_1$=fraction of light reflected at first surface (inside of $r_2$)

$F_2$=fraction of light reflected at the second surface (inside of $r_1$).

Then employing the equation for the direct transmission of light, the brightness of the image can be determined as follows:

$$\text{Image brightness} = K(1-F_1)(1-F_2)$$

where K=a constant which can readily be determined from the absorptive and refractive qualities of the particular material being used for the optical lens. Therefore, the Image Brightness of the reflective path $$B_3 = K(1-F_1)(1-F_2)F_2 F_1$$

Carrying this equation to its logical conclusion the brightness ratio of the $n^{\text{th}}$ order of the reflected image to the directly transmitted image is equal to $(F_2 F_1)^n$, and it is to be noted that $F_2$ does not necessarily equal $F_1$.

Thus, it will be seen that the brightness of any reflected image as compared to the brightness of the directly transmitted image varies directly with the product of the fraction (F) of light reflected by the inside of the surfaces $r_1$ and $r_2$, raised to the power corresponding to the order of the reflected image. Accordingly, if one half of the intensity of the incoming beam B were reflected at the inside of $r_2$ to form part $B_2$ and one half of the latter were reflected at the inside of $r_1$ to form part $B_3$, only one fourth of the intensity of the original beam B would be present in the beam $B_3$, which is of the first reflective order. Thus, by controlling the thickness of coating on the reflective surfaces $r_1$, $r_2$, the intensity of the reflected image from the original image can be controlled so that a good reflective image can only be seen when this image is of the first reflective order. Since the reflected image with which the present invention is concerned is that of the signals S, the thickness of the coatings on the surfaces $r_1$, $r_2$ of the optical lens are adjusted to produce this one good image.

Furthermore, as concerns the targets T, the intensity of their illumination is controlled to be less than that of signals S in the first instance, so that while the same reflection may occur, as analyzed above in connection with the beam B, the reflective image of the targets T would not be a good image and would not distract the pilot.

Essentially then, what is seen by the pilot when using the visor V, is shown in FIGS. 10, 11 and 12. Referring to FIG. 10, the optical lens O produces the reflected images $S_1$ of the signals or directly transmitted images S, in a position below their actual position. The images $S_1$ are thus rotated about the pitch axis of the aircraft through the constant angle $\theta_0$ along an apparent line of sight from the aircraft to the signals S, as compared with the actual line of sight to those signals. This constant angle which is built into the aircraft preferably by means of the optical lens O illustrated in FIGS. 8 and 9 (although the optical lens could readily be movably and suitably mounted in the cockpit on the airframe instead of being carried by a visor worn by the pilot) is the angle which should be maintained between the lines of sight diverging from the aircraft to the signals S and the targets T respectively, if the aircraft is to be kept on the proper flight path.

Thus, if the aircraft is kept on this proper descent flight path, the pilot will see the configuration illustrated in FIG. 10 wherein the reflective images $S_1$ are in alinement with the targets or directly transmitted images T.

On the other hand, a position above the proper flight path would result in the configuration illustrated in FIG. 11 wherein the reflective images $S_1$ are out of alinement and located above the targets or direct images T, and a position below the flight path would result in the configuration shown in FIG. 12, the reflective images $S_1$ being out of alinement and located below the targets T.

The pilot then is required only to maneuver the aircraft to maintain alinement between the lower images $S_1$ of the signals S and the targets T, in order to stay on the proper flight path. By the previous selection of the built-in constant angle $\theta_0$, this procedure including the achieving and maintaining of this constant angle between the lines of sight diverging from the aircraft to signals S and targets T respectively, can be continued to the landing surface with assurance that touchdown will be established with an acceptable descent rate, (and more specifically, the vertical component thereof commonly termed sink speed), and that the location of the touchdown point will be at the most desirable point, namely adjacent the targets T, which as previously shown in FIGS. 1–4 for example, are preferably located at $A/2$. As is also clearly seen from FIGS. 10, 11 and 12, azimuth or lateral guidance is readily provided by the symmetry of the display of the images S, $S_1$ and T.

Furthermore, since the touchdown point will actually be somewhat short of the targets T because of the aforedescribed "wheel-to-eye" distance, both the targets T and the signals S in the preferred embodiment, remain in view until after the aircraft is on the landing surface, and then the signals S alone provide guidance for taxiing on down the landing surface.

In the event that the double imaging produced by the viewing device incorporating the optical lens O of FIGS. 8 and 9 becomes at any time objectionable to the pilot, for example, if the relative intensity of the signals S and the targets T were not adjusted as they should be, suitable filtering (not shown) can readily be incorporated in the visor. This filtering will, for example, permit the targets T to be seen only in the direct view and the images S, $S_1$ only in the rotated view, thereby completely removing any undesirable double images. Commercially available multilayer interference filters can be used for this purpose.

In regard to the targets T and signals S, it is apparent that a great variety of configurations other than those heretofore described are possible. In the interest of security for example, shielded directional lights may be employed. In an emergency, pyrotechnic flares may be used. On the other hand, a bar of lights or flares may be used instead of the spherical lights for the signals illustrated, to define the end of the landing area in short field applications. Vehicle lights would also work quite well in an emergency.

Infra-red system

Instead of the above described optical system, an infra-red instrumentation of the previously set forth geometry may be employed as a modification of the invention. The desirability of such a system would depend entirely upon the tactical requirements of the user, and would be particularly adapted to tactical employment of Army aircraft. For example, if maximum security is required and this implies no visible lighting at the landing site, such a system would be desirable. It would also present a certain measure of capability in low visibility conditions which would not be inherent in a visible light system, such as the one illustrated.

An embodiment of such an infra-red system would simply require replacing the signal and target means on the landing surface with infra-red sources and utilization of an infra-red detector in the aircraft instead of the optical lens illustrated. The detector would then measure the angle between the sources on the landing surface and present the data on a typical cross pointer display in the aircraft. Lateral guidance would be derived in the same manner except that in the lateral case the desired lateral angle between the sources would be zero. A single pair of signal and target means is implied here and they would be located in the center of the landing area.

All weather system

Upon further consideration of the geometry of the system, it is apparent that the unique feature, e.g. that only one measurement is involved in the system, offers an opportunity for a very simple instrumentation in an all weather version, as a further modification of the invention. A system of instrumentation is generally presented herein which utilizes this unique feature.

Figure 13:
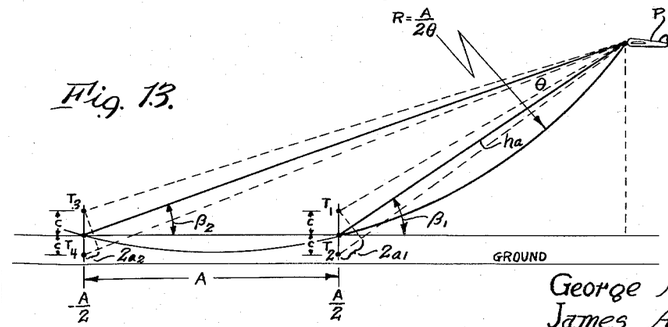
FIG. 13 is an elevational view similar to FIG. 1, but illustrating a modification of the invention wherein transmitters on the landing surface are employed instead of the luminous signal and target means shown in FIG. 1, and receiving equipment in the aircraft is employed in place of the optical lens illustrated in FIGS. 8 and 9.

As shown in FIG. 13, the system involves the use of four transmitters $t_1$, $t_2$, $t_3$, $t_4$ on the ground and a single receiver in the aircraft.

All four of the transmitters generate frequencies in the region of 400 megacycles. Transmitters $t_1$ and $t_2$ generate frequencies $f_1$ and $f_2$ respectively, and the difference frequency between them is $\Delta f = f_1 - f_2$. Similarly, transmitters $t_3$ and $t_4$ generate frequencies $f_3$ and $f_4$ with a difference $\Delta f = f_3 - f_4 = f_1 - f_2$. The four transmitters are synchronized, by generating their frequencies from the same reference oscillator, in such a manner that the beat frequencies of the pairs are in phase.

If the signals from a pair of transmitters (for example $t_1$ and $t_2$) are received in an aircraft, the beat signal will be phase shifted by an amount $$\Delta \phi 1,2 = \frac{2a_1}{\lambda 1} 2\pi$$

where $2a_1$ equals the path length difference, and $\lambda 1$ equals the wave length of the higher frequency of the pair. In a similar manner, the beat signal from the other pair would be phase shifted by the path length difference to an amount $$\Delta \phi 3,4 = \frac{2a_2}{\lambda 2} 2\pi$$

If a phase comparison is made between these two beat signals, the phase difference which would be measured would be $$\Delta \phi = \frac{4\pi}{\lambda}(a_1 - a_2)$$

Since $\lambda 1$ and $\lambda 2$ are nearly the same, as defined earlier, $\lambda$ is used to approximate their value.

In summary, it is proposed to transmit four frequencies from an array of antennae on the ground, beat pairs of frequencies, and then make a phase comparison of the two resulting beat signals.

Referring to FIG. 13, it can be demonstrated in the following manner, that this phase measurement represents $\theta$, the angular information needed in the aricraft.

$2a_1 =$ the path length difference between the two antennae of the first array and the aircraft.

$2a_2 =$ the path length difference between the two antennae of the second array and the aircraft.

Assuming the aircraft is at a range such that the slope of the hyperbola asymptote $ha$ (actually $\approx$ tangent to circular flight path at $A/2 \approx$ line of sight from P to $A/2$) closely approximates the line of sight angle $\beta_1$.

$$\beta_1 = \tan^{-1} \frac{a_1}{(c^2 - a_1^2)^{1/2}}$$

And for $-A/2$:

$$\beta_2 = \tan^{-1} \frac{a_2}{(c^2 - a_2^2)^{1/2}}$$

From FIGURE 13:

$$\theta = \beta_1 - \beta_2$$

Making the small angle assumption on $\theta$, i.e.: substantially less than 1 radian, $$\theta = \tan \theta = \tan(\beta_1 - \beta_2) = \frac{\tan \beta_1 - \tan \beta_2}{1 + \tan \beta_1 \tan \beta_2}$$

$$= \frac{\frac{a_1}{(c^2-a_1^2)^{1/2}} - \frac{a_2}{(c^2-a_2^2)^{1/2}}}{1 + \frac{a_1}{(c^2-a_1^2)^{1/2}} \frac{a_2}{(c^2-a_2^2)^{1/2}}}$$

$$= \frac{(c^2-a_2^2)^{1/2} a_1 - (c^2-a_1^2)^{1/2} a_2}{(c^2-a_1^2)^{1/2}(c^2-a_2^2)^{1/2} + a_1 a_2}$$

$$\tan \beta_1 = \frac{a_1}{(c^2-a_1^2)^{1/2}}, \quad \tan^2 \beta_1 = \frac{a_1^2}{c^2 - a_1^2}$$

$$c^2 \tan^2 \beta_1 = a_1^2 (1 + \tan^2 \beta_1)$$

$$a_1^2 = \frac{c^2 \tan^2 \beta_1}{1 + \tan^2 \beta_1}$$

$$a_1 = \frac{c \tan \beta_1}{(1 + \tan^2 \beta_1)^{1/2}}$$

Similarly $$a_2^2 = \frac{c^2 \tan^2 \beta_2}{1 + \tan^2 \beta_2}$$

$$a_2 = \frac{c \tan \beta_2}{(1 + \tan^2 \beta_2)^{1/2}}$$

$$\theta = \frac{\left(c^2 - \frac{c^2 \tan^2 \beta_2}{1+\tan^2 \beta_2}\right)^{1/2} a_1 - \left(c^2 - \frac{c^2 \tan^2 \beta_1}{1+\tan^2 \beta_1}\right)^{1/2} a_2}{\left(c^2 - \frac{c^2 \tan^2 \beta_1}{1+\tan^2 \beta_1}\right)^{1/2} \left(c^2 - \frac{c^2 \tan^2 \beta_2}{1+\tan^2 \beta_2}\right)^{1/2} + \frac{c^2 \tan \beta_1 \tan \beta_2}{(1+\tan^2 \beta_2)^{1/2}(1+\tan^2 \beta_1)^{1/2}}}$$

If $\tan \beta_1$ and $\tan \beta_2$ are substantially less than 1:

$$\theta = \frac{a_1 - a_2}{c}$$

The phase difference between the beat signals is:

$$\Delta\phi = \frac{4\pi}{\lambda}(a_1 - a_2)$$

$$\Delta\phi = 4\pi \frac{c}{\lambda} \theta$$

Thus it is seen that the value of $\theta$ may be determined by measuring the phase angle between the beat signals. The sensitivity of the measurement $$\frac{\Delta\phi}{\theta} = 4\pi \frac{c}{\lambda}$$

may now be examined. As specified earlier, the transmitters are all operating near 400 mc., thus $$\lambda = 0.75 \text{ meter}$$

If $c$ is set at 1.2 meters, $$\frac{\Delta\phi}{\theta} = \frac{4\pi 1.2}{0.75} = 20 \text{ degrees per degree}$$

Since the value of $\theta$ which is to be measured is substantially less than one radian, and approximately 0.5 degree, and this angle should be controlled to about $\pm 0.1$ degree, a phase measurement accuracy of the order of 2 degrees is required.

This value of $c$ of 1.2 meters would result in the uppermost antenna being approximately 8 feet above the ground level.

From the foregoing analysis it is seen that the all-weather system makes use of the simplicity of the geometry inherent in the aforesaid visual and infra-red systems. It results in a simple phase measurement being made in the aircraft which produces directly the single piece of information required to guide the aircraft to touchdown. The equipment on the ground does not need to be manned. There is no requirement that the aircraft be tracked. There is no data link involved since the error signal is derived in the plane as before. The frequency region selected permits antennae of reasonable size and the use of quite ordinary receiving and transmitting equipment.

Further consideration of the geometry of the system makes it readily apparent that its unique feature, i.e. measurement of only one quantity, the constant angle $\theta_0$, offers an opportunity for a very simple instrumentation in an all-weather version.

*Tactical employment*

A. *Flight paths.*—Since the landing velocity of Army aircraft falls in a rather narrow, low speed region, it appears that a single value of the constant $\theta_0$ angle between the lines of sight may be used with satisfactory results. It will be assumed for simplicity that the highest touchdown or landing ground speed will be 60 miles per hour or 88 feet per second, and that the wheel to eye distances will fall in the range of from 5 to 8 feet for the various aircraft.

Using a constant value for $\theta_0$ in all aircraft results in the radius of the flight path becoming a function solely of the spacing A between the ground targets:

$$R = \frac{A}{2\theta_0}$$

If the value of 0.01 radian ($=\frac{\pi}{180} .01 \approx .5$ degrees) is selected for $\theta_0$ $$R = 50A$$

This allows the flight path to be varied by the ground personnel to avoid terrain obstacles by simply varying the spacing between the targets and signals.

Figure 14:
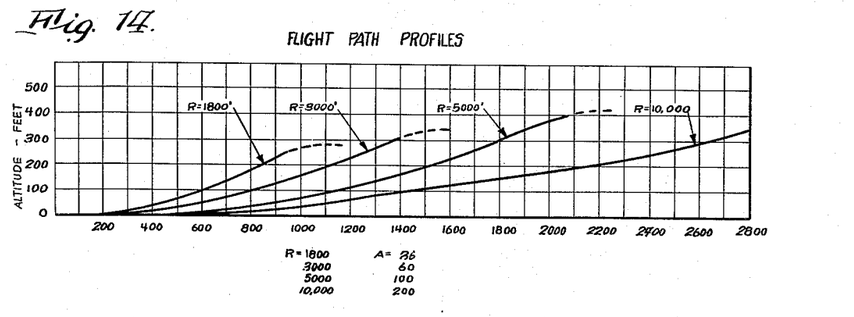
FIG. 14 is a diagrammatic view illustrating a series of complete descent flight paths.
Figure 15:
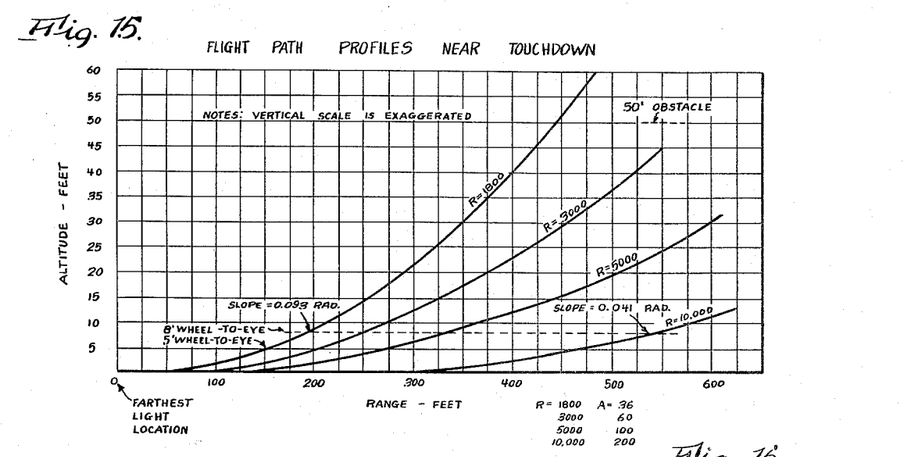
FIG. 15 is a similar view in which only the terminal portion of the paths illustrated in FIG. 14 are shown on an enlarged scale.

A series of flight paths are illustrated in FIGURES 14 and 15. These paths are for radii of 1800, 3000, 5,000 and 10,000 feet. FIGURE 14 shows the overall paths, and FIGURE 15 illustrates the terminal portions of these same paths on an expanded scale. The 1800 foot radius path gives an adequate clearance over a 50 foot obstacle on a 500 foot long field, and is considered to be the extreme case. Paths of lesser curvature would be used whenever the terrain permitted.

The touchdown points may be determined from FIGURE 15 for the wheel to eye distance range of 5 to 8 feet which was assumed. The slopes of the paths may be determined and it can be seen that the most severe slope is encountered with the 8 foot wheel to eye distance and the 1800 foot radius. Since this path is for a short field landing over a 50 foot obstacle, it does not appear realistic to use the maximum touchdown velocity of 88 feet per second for this case. The maximum touchdown speed for this 500 foot field is assumed to be 40 miles per hour or 58.6 feet per second, which in view of the 0.093 radian slope results in a sink speed of 5.45 feet per second at touchdown. The sink speed for a lower wheel to eye distance aircraft would of course be somewhat lower.

In the event that the sink speeds for the higher wheel to eye distances are considered excessive, this may be remedied by simply elevating the targets three feet or so above the ground. This would result in sink speeds for the 8 foot wheel to eye distance which correspond to the 5 foot examples employed in the following discussion.

For the larger radius curves (5,000 and 10,000) the aircraft having a maximum touchdown speed of 88 feet per second will be encountered. The maximum slope at touchdown corresponds to an 8 foot wheel to eye distance on the 5,000 foot radius path, and is 0.041 radian. This would give a sink speed of 3.61 feet per second at touchdown.

All of the sink speeds encountered above are reasonable and well inside the limit capabilities of present aircraft designed for rough field use. The minimum roll out distance OD occurs in the case of a 5 foot wheel to eye distance plane on the 1,800 foot curve. A value of 150 feet is indicated.

The basic technique preferred for getting on a flight path is to fly the aircraft at approximately constant altitude until interception. Following this, the descent is accomplished using the power approach technique now used by the Army for short field landings. This procedure has been flight tested and found to be reasonable for the flight paths shown. In the case of the shallower glide paths a more conventional technique may be used since the descent rates required are lower.

From the foregoing it is seen that the flight paths are readily adjustable by the ground personnel and that the descent rates at touchdown, roll out distances, terrain clearance capabilities, and the basic flight paths themselves are reasonable and realistic for Army fixed wing aircraft.

Figure 16:
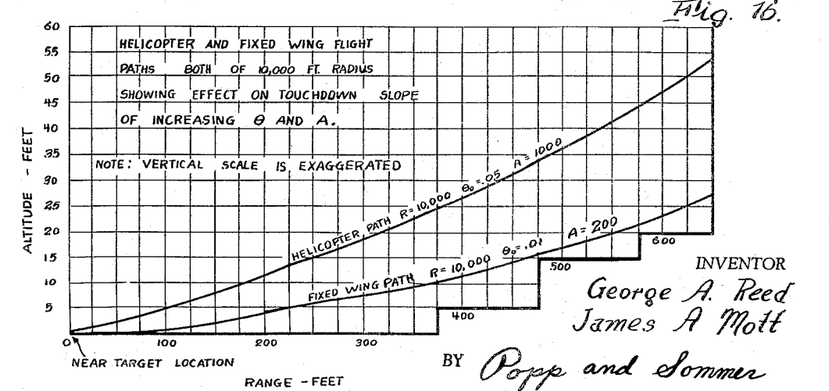
FIG. 16 is a view similar to FIG. 14, but illustrating how the descent flight paths may readily be varied to give steeper descents for helicopters by changing the constant angle and distance between the signal and target means on the landing surface.

Helicopters may fly these same flight paths, or if desired, the paths may be varied to give steeper descents at the ground by varying the $\theta_0$ angle and A distance. FIGURE 16 illustrates the effect of increasing the value of $\theta_0$ and A by a factor of 5. The same radius is retained but the path is steeper near touchdown.

B. *Installation techniques.*—Since the basic flight path obtained from the system is curved, it is not immediately obvious what A distance is required to clear any given terrain configuration when first occupying an unprepared site. If several hours of daylight time are available, the various terrain obstacles can easily be checked and a suitable configuration selected.

A way is needed for placing the system in operation in a matter of minutes, at night, when only the top of the mask of an obstacle is visible. This requires the use of a rapid technique to establish an A distance and therefore a flight path which will guarantee safe clearance.

Figure 17:
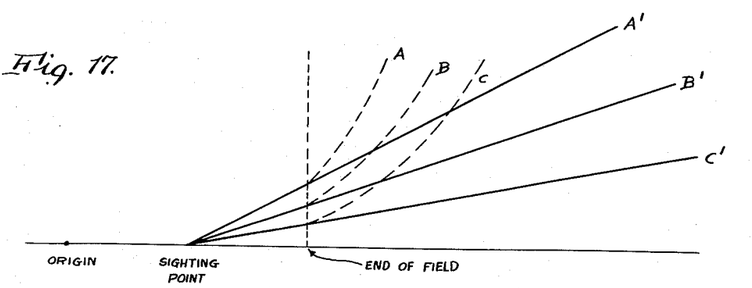
FIG. 17 is a schematic view illustrating a basic step in the installation procedure for selecting a particular distance between a signal and target means on the landing surface to provide a descent flight path with adequate terrain clearance.

In all cases, there is a requirement that a landing area of 500 feet or more exists which is free of obstructions. A variety of flight paths are available in approaching this area, depending upon the A distance used. Each path is unique in that it has a different ground clearance as it passes over the end of the field, or over any other particular point. If, from some point on the field, a straight line is drawn to intersect each of these possible paths at the end of the field, a series of radials will result which define a particular A distance and corresponding flight path that guarantees clearance over any obstacle below that specific radial. An exaggerated illustration of this is shown in FIGURE 17.

Figure 18:
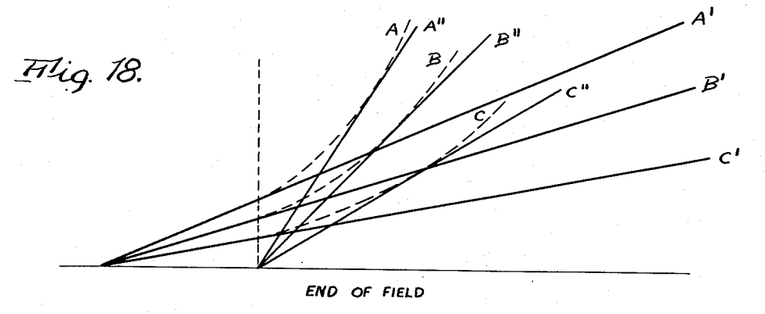
FIG. 18 is a view similar to FIG. 17 but illustrating a supplemental step in the installation procedure and producing the lowest possible flight path having adequate terrain clearance.

It is possible then in a hasty installation, simply to pace off a specific distance from the landing end of the field and measure the elevation angle to the mask. The measured angle would immediately indicate in a simple table, the A distance (corresponding to the lowest flight path) which may be used. This procedure will always result in safe clearance over obstacles. It does not, however, necessarily result in the lowest possible flight path. This can be seen in FIGURE 17, where an assumed obstacle just reaching radial A' can only be cleared by flight path A if it is located close to the end of the field. If it is located farther away from the end of the field, however, it will also be cleared by path B although it extends up to radial A'. This situation can be improved, if desired, by making a second sighting measurement at the end of the field. This second measurement would be compared to the angles of a set of radials drawn from the end of the field to the point of tangency for each path. These additional radials are shown in FIGURE 18.

An assumed obstacle appearing below radial B" would obviously be cleared by path B, although it might extend above radial B'. The second set of radials then allows a lower flight path to be used in the case of relatively tall obstacles located a great distance away from the end of the field.

In the same manner, a low obstacle very near the end of the field might require an unnecessarily steep flight path if the first measurement had not been made. The two measurements then always supplement one another, but never conflict in selecting a flight path. The technique outlined here does not require any knowledge of the height of, or range to an obstacle.

The only equipment required for the operation consists of a simple sighting device for measuring vertical angles, and having a small name-plate type reference table attached. One man can perform the entire operation of measuring the distance, making a single sight reading to the mask, and determining the appropriate A distance to be used. When time permits, additional readings can be made to optimize the flight path, if desired.

Straight line approach system

Figure 19:
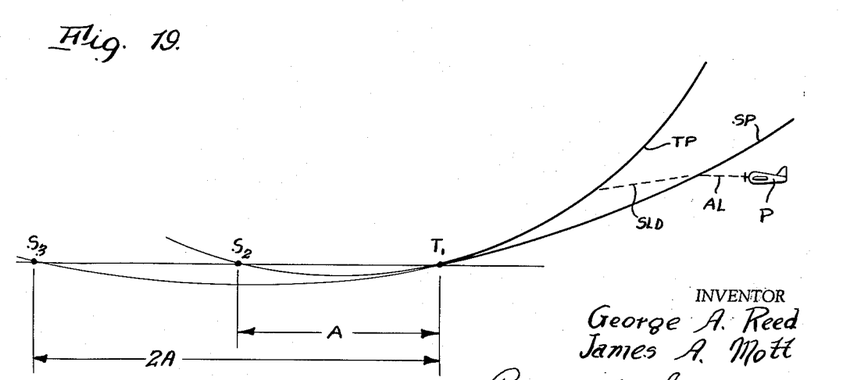
FIG. 19 is a schematic view quite similar to FIG. 3 but illustrating a modification of the invention, wherein a second flight path is provided in order to permit a straight line approach of the aircraft to a point where the pilot would normally begin his "flare" or arcuate descent flight path.

Referring to FIG. 19, it illustrates a further modification of the invention which is actually a duplication of the geometry illustrated in FIG. 1. In the straight line approach geometry, a single pair of targets $T_1$ are employed and two pairs of signals $S_2$ and $S_3$ are utilized. The targets $T_1$ and the signals $S_2$ are separated by the distance A to provide the terminal flight path TP to be followed to touchdown, while the targets $T_1$ and signals $S_3$ are separated by the distance 2A to provide a shallower curved flight path SP which acts as a means for warning the pilot that he is approaching the steeper terminal flight path TP.

Viewing the configuration from the pilot's position, he would be approaching the shallower curve in his normal straight line approach at the pre-descent altitude, say five hundred feet, in the pre-established pattern. As the pilot turns the plane on its approach leg AL, he would intersect the shallower flight path SP and would see the directly transmitted images along the lines of sight from the aircraft to signals $S_3$ and the targets T along with the reflected image of $S_3$ in a manner similar to that illustrated in FIGS. 10, 11 and 12. The pilot would then begin his normal straight line descent SLD, not being particularly concerned with the shallower flight path. Shortly thereafter the aircraft P would intersect the steeper flight path TP and the pilot would then concentrate upon the directly transmitted images from targets $T_1$ and signals $S_2$, together with the reflected images of signals $S_2$. Immediately, the pilot could tell whether the aircraft was above or below the steeper flight path and make the necessary adjustments to line up the reflected images of signals $S_2$ with the targets $T_1$ to maintain the correct flight path to touchdown.

This so-called straight line approach system is particularly adapted for use with commercial airports where relatively long and shallow approaches are made, and accommodates itself to normal descent procedure, because the pilot can follow his usual straight line approach until quite close to the end of the runway and then follow the prescribed steeper curved flight path to the touchdown point. In all other respects, this straight line approach system is precisely like that illustrated in FIGS. 1–12, and could also readily be used in conjunction with the infrared and all-weather systems described above, provided the proper additional equipment was used.

Definition of terms

In order to prevent any ambiguity or unduly restricted interpretation of the foregoing detailed description and accompanying claims, the following definitions of terms are given.

The term "landing surface" is intended to refer not only to a stationary landing area such as would be used in conjunction with land based aircraft, but is equally applicable to landing areas provided on floating supports such as aircraft carriers or floating docks, as well as an area of water for landing sea based aircraft, or in fact any suitable surface on which an aircraft can alight.

The term "aircraft" is defined herein as including all types of free flight craft, including fixed or rotary wing type, and whether used for civilian, military, air or naval purposes.

The term "line of sight" is defined herein to include not only visual lines of sight, but also lines of sight below the visual range such as infra-red, and lines of sight above the visual range, such as radio frequencies, employed for example in the all weather system.

Summary

It will now be seen how the invention accomplishes its various objects previously set forth. It will also be seen that the invention constitutes a simple yet most effective landing system including a method and means which are adapted for use in connection with all types of aircraft and landing surfaces under all types of weather conditions, and which are particularly adapted for use in conjunction with Army aircraft, especially in night operation on unprepared fields. The primary system is embodied in visual method and means, but can also be embodied in infra-red or all-weather versions, all of which are based upon the unique geometrical principle which assures adequate terrain or obstacle clearance, touchdown at the predetermined point, and an acceptable vertical descent rate or sink speed at touchdown, and regardless of which of the aforesaid systems are employed, only one measurement of a single quantity need be made, namely the constant angle $\theta_0$ between the lines of sight from the aircraft to target and signal means spaced apart a predetermined distance longitudinally along a landing surface.

Further, the error signal is derived in the aircraft, and consequently no data link is required from the landing surface to the aircraft, nor does the landing surface installation require any personnel following installation, since no tracking of the aircraft is involved. In practicing the teachings of the invention, the curvature of the descent flight path is readily variable merely by adjusting the spacing between the target and signal means along the runway, and a series of curves can readily be determined through the system's geometry, which feature highlights the flexibility of the descent flight path and how terrain or other obstacles may be avoided. In addition, a procedure is set forth in which landing surface personnel may use simple equipment in a relatively short period of time to provide adequate terrain or obstacle clearance and the desired spacing between target and signal means to be used.

The descent rates or sink speeds which are encountered on the various flight paths illustrated are not to be considered limiting but merely illustrative, yet at the same time appear to be quite reasonable for the particular types of aircraft involved. It is further evident that the flight paths used for fixed wing aircraft may be used for rotary wing aircraft also, or in the event that a steeper glide path angle is desired at touchdown, a simple modification may be used to create special helicopter flight paths.

While certain preferred embodiments of the invention have been described and illustrated herein, it is to be understood that various modifications and changes may be made therein without departing from the spirit or basic concept of the invention, the scope of which is to be determined by the appended claims.

What is claimed is:

1. A method of landing aircraft which comprises measuring the angle between lines of sight diverging from the aircraft to signal and target means spaced apart longitudinally along a landing surface by comparing said angle to a predetermined constant angle, and maneuvering the aircraft to adjust the angle between said lines of sight to correspond to said constant angle.

2. An apparatus for landing aircraft which comprises signal and target means spaced apart longitudinally along a landing surface, and means producing in an aircraft indicia along an apparent line of sight at a constant angle to a first actual line of sight from the aircraft to said signal means, and another indicia along a second actual line of sight from the aircraft and diverging from said first actual line of sight to said target means, so that the aircraft can be maneuvered to achieve and maintain alinement between both said indicia.

3. An apparatus for landing aircraft which comprises signal and target means spaced a predetermined distance A apart longitudinally along a landing surface, said target means forming substantially a point of intersection between the landing surface and an arcuate path having a radius R and being defined by the equation R is substantially equal to $A/2\theta_0$ where $\theta_0$ is substantially less than one radian, and means producing in an aircraft indicia along an apparent line of sight at a constant angle $\theta_0$ to a first actual line of sight from the aircraft to said signal means, and another indicia along a second actual line of sight from the aircraft and diverging from said first actual line of sight to said target means, whereby the aircraft will descend along said arcuate path if maneuvered to achieve and maintain substantial alinement between both said indicia.

4. An apparatus for landing aircraft which comprises signal and target means spaced a predetermined distance A apart longitudinally along a landing surface, said signal and target means forming substantially points of intersection between the landing surface and a circular path having a radius R and being defined by the equation R is substantially equal to $A/2\theta_0$, and having a slope substantially at said target means equal to $\theta_0$ where $\theta_0$ is substantially less than one radian, and means producing in an aircraft indicia along an apparent line of sight at a constant angle $\theta_0$ to a first actual line of sight from the aircraft to said signal means, and another indicia along a second actual line of sight from the aircraft and diverging from said first actual line of sight to said target means, whereby the aircraft will descend along said circular path and touchdown adjacent said target means if the aircraft is maneuvered to achieve and maintain substantial alinement between both said indicia.

5. An apparatus for landing aircraft which comprises signal and target means spaced apart longitudinally along a landing surface, and means producing in an aircraft indicia along an apparent line of sight at a constant angle to an actual line of sight from the aircraft to said signal means, so that the aircraft can be maneuvered to achieve and maintain substantial visual alinement between said indicia and said target means.

6. An apparatus for landing aircraft which comprises luminous signal and target means spaced apart longitudinally along a landing surface, and optical means producing in an aircraft a first image along a first visual line of sight from the aircraft to said signal means, a second image along a second visual line of sight from the aircraft to said target means and diverging from said first visual line of sight, and a third image spaced from said first image along a third apparent visual line of sight from the aircraft to said signal means at a predetermined constant angle to said first line of sight, so that the aircraft can be maneuvered to achieve and maintain substantial alinement between said second and third images.

7. In apparatus for landing aircraft, the combination which comprises signal and target means spaced a predetermined distance A apart longitudinally along a landing surface said target means forming substantially a point of intersection between the landing surface and an arcuate path having a radius R and being defined by the equation R is substantially equal to $A/2\theta_0$ where $\theta_0$ is substantially less than one radian, and said signal and target means presenting constant angle $\theta_0$ between lines of sight diverging from an aircraft to said signal and target means, so that the aircraft can be maneuvered to achieve and maintain substantially said constant angle.

8. In apparatus for landing an aircraft, optical means comprising a lens and means for supporting the same, said lens producing in an aircraft a first image along a first visual line of sight from the aircraft to luminous signal means on a landing surface, a second image along a second visual line of sight from the aircraft to luminous target means and diverging from said first visual line of sight, said target means being spaced apart from the signal means longitudinally along the landing surface, and a third image spaced from said first image along a third apparent visual line of sight from the aircraft to the signal means at a predetermined constant angle to said first line of sight, so that the aircraft can be maneuvered to achieve and maintain substantial alinement between said second and third images.

References Cited in the file of this patent

UNITED STATES PATENTS

| | | |
|---|---|---|
| 2,272,997 | Alford | Feb. 10, 1942 |
| 2,280,126 | Metcalf | Apr. 21, 1942 |
| 2,426,184 | Deloraine | Aug. 26, 1947 |
| 2,436,846 | Williams | Mar. 2, 1948 |
| 2,497,427 | Weiss | Feb. 14, 1950 |